(12) United States Patent
Hojo et al.

(10) Patent No.: US 6,590,778 B1
(45) Date of Patent: Jul. 8, 2003

(54) MEMORY CARD

(75) Inventors: Atsushi Hojo, Nara (JP); Hiroshi Yoshiya, Osaka (JP); Noriaki Furata, Shiga (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/807,110

(22) PCT Filed: Aug. 4, 2000

(86) PCT No.: PCT/JP99/05274

§ 371 (c)(1),
(2), (4) Date: Sep. 7, 2001

(87) PCT Pub. No.: WO01/11556

PCT Pub. Date: Feb. 15, 2001

(30) Foreign Application Priority Data

Aug. 6, 1999 (JP) .............................. 11-223385

(51) Int. Cl.⁷ .................................. H05K 1/14
(52) U.S. Cl. ..................... 361/737; 361/726; 361/732; 361/747; 361/740; 257/679
(58) Field of Search .................. 361/737, 731, 361/823, 740, 726, 747, 756, 684, 685, 732; 174/0; 257/679

(56) References Cited

U.S. PATENT DOCUMENTS 4,797,542 A * 1/1989 Hara ........................ 235/380
5,016,086 A * 5/1991 Inoue et al. ................ 257/690
5,539,600 A * 7/1996 Lee et al. ................... 360/133
6,145,023 A * 11/2000 Iwasaki ....................... 710/13

FOREIGN PATENT DOCUMENTS

| EP | 1050887 | 11/2000 |
|---|---|---|
| JP | 03025589 | 2/1991 |
| JP | 03064172 | 3/1991 |
| JP | 7-111062 | 4/1995 |
| JP | 07182245 | 7/1995 |
| JP | 08166906 | 6/1996 |
| JP | 10-199202 | 7/1998 |
| JP | 10-340575 | 12/1998 |

* cited by examiner

*Primary Examiner*—David Martin
*Assistant Examiner*—Hung Buhi
(74) *Attorney, Agent, or Firm*—RatnerPrestia

(57) ABSTRACT

A memory card includes a memory card main body having a cut-out portion formed therein; a semiconductor memory in which data is at least writable; a terminal provided on the memory card main body for electrically connecting the semiconductor memory and an external apparatus; and a writing permitting/prohibiting setting member slidably engaged with the cut-out portion for setting data write to the semiconductor memory to be permitted or prohibited. The writing permitting/prohibiting setting member includes a main body for covering a portion of the cut-out portion. The writing permitting/prohibiting setting member slides along the cut-out portion so as to set data write to the semiconductor memory to be permitted or prohibited.

17 Claims, 8 Drawing Sheets

FIG. 5
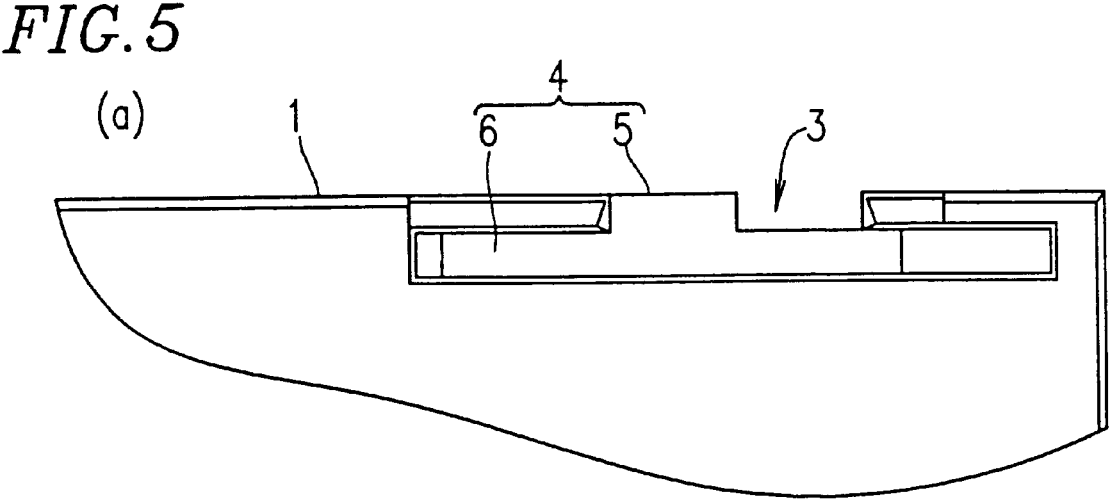
(a)
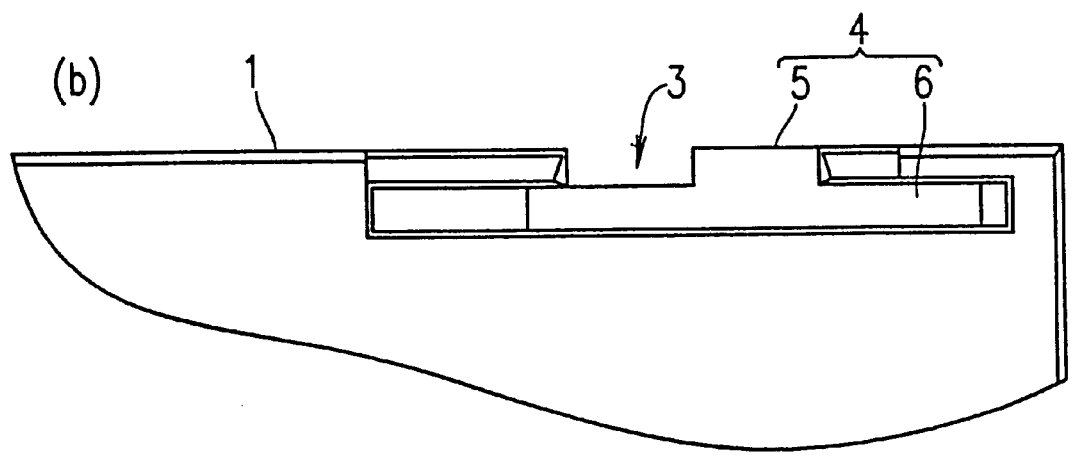
(b)

FIG. 6
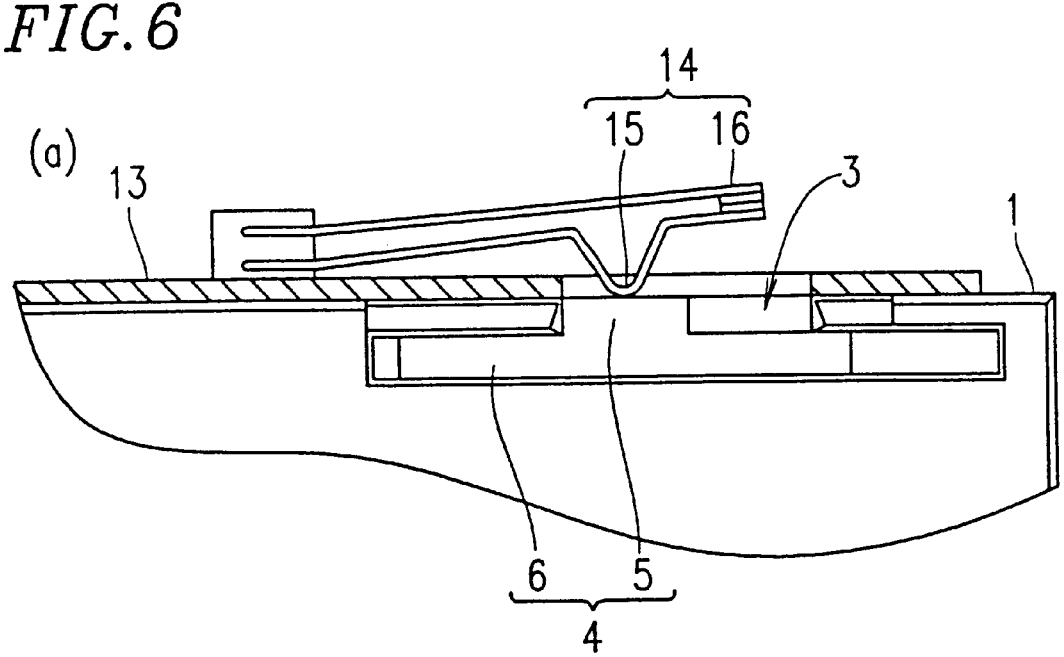
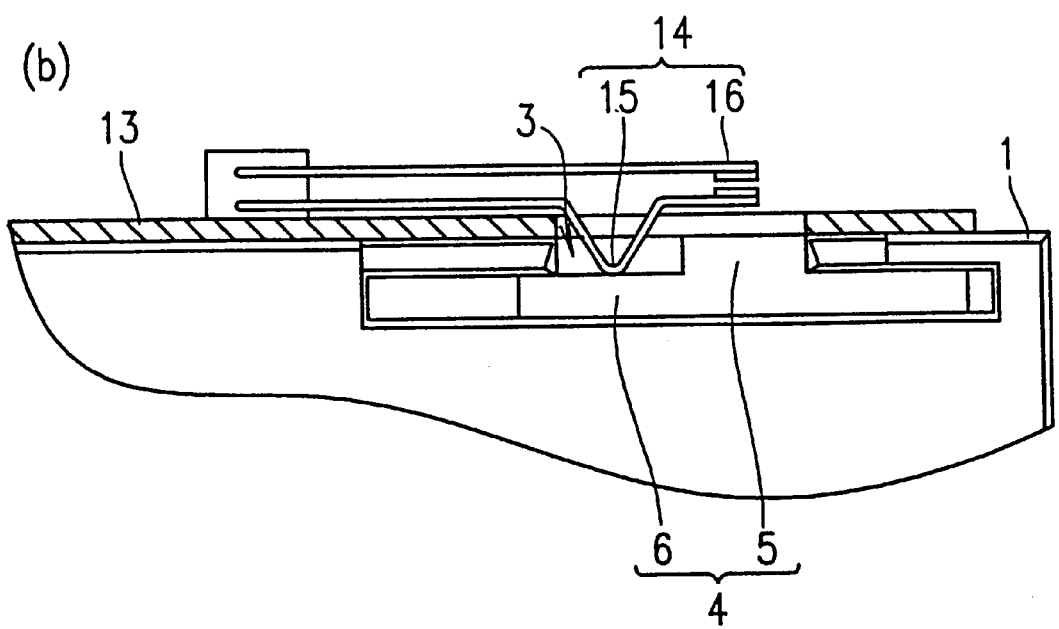

MEMORY CARD

TECHNICAL FIELD

The present invention relates to a memory card having writing permitting/prohibiting setting means for preventing data stored therein from being inadvertently erased or rewritten.

BACKGROUND ART

Conventionally, writing permitting/prohibiting setting means for a memory card uses a reflective sheet or a switch.

FIG. 9 shows an isometric view of a conventional memory card 900 having writing permitting/prohibiting setting means in the form of a reflective sheet 23. In FIG. 9, reference numeral 21 represents a memory card main body, reference numeral 22 represents a terminal integrally provided with the memory card main body 21, and reference numeral 23 represents the reflective sheet.

The memory card main body 21 has a rewritable semiconductor memory (not shown) therein. An apparatus (not shown) electrically connected to the semiconductor memory through the terminal 22 reads and rewrites data stored in the semiconductor memory. In this example, the reflective sheet 23 is used as the writing permitting/prohibiting setting means. Whether writing is permitted or prohibited is set by pasting the reflective sheet 23 at a prescribed position of the memory card main body 21 or peeling off the reflective sheet 23. The apparatus detects whether the writing is set to be permitted or prohibited by detecting a reflecting state of the prescribed position of the memory card main body 21 by a photocoupler or the like.

FIG. 10 is an isometric view of a conventional memory card 1000 having writing permitting/prohibiting setting means in the form of a switch 33. In FIG. 10, reference numeral 31 represents a memory card main body, reference numeral 32 represents a terminal integrally provided with the memory card main body 31, and reference numeral 33 represents the switch.

The memory card main body 31 has a rewritable semiconductor memory (not shown) therein. An apparatus (not shown) electrically connected to the semiconductor memory through the terminal 32 reads and rewrites data stored in the semiconductor memory. In this example, the switch 33 is used as the writing permitting/prohibiting setting means. Whether writing is permitted or prohibited is set by switching the switch 33. The apparatus electrically detects the setting of the switch 33 through the terminal 32.

In such memory cards, it is demanded to reduce the size and thickness of the memory card main body while simplifying the writing permitting/prohibiting setting operation.

The conventional memory card 900 having the writing permitting/prohibiting setting means in the form of the reflective sheet 23 does not have a mechanical structure for the writing permitting/prohibiting setting means, and therefore is effective to reduce the size and thickness of the memory card main body 21. However, since writing is set to be permitted or prohibited by pasting or peeling off the reflective sheet 23, the memory card 900 is not convenient in terms of the writing permitting/prohibiting setting operation.

The conventional memory card 1000 having the writing permitting/prohibiting setting means in the form of the switch 33 sets writing to be permitted or prohibited by switching the switch 33, and therefore is simple in terms of the writing permitting/prohibiting setting operation. However, since the switch is built in, the memory card 1000 is limited in reduction in the size and thickness of the memory card main body 31.

The present invention has been made with an objective of providing a memory card having writing permitting/prohibiting setting means which is simple in terms of a setting operation and can be reduced in the size and thickness of a memory card main body.

DISCLOSURE OF THE INVENTION

A memory card according to the present invention includes a memory card main body having a cut-out portion formed therein; a semiconductor memory in which data is at least writable; a terminal provided on the memory card main body for electrically connecting the semiconductor memory and an external apparatus; and a writing permitting/prohibiting setting member slidably engaged with the cut-out portion for setting data write to the semiconductor memory to be permitted or prohibited. The writing permitting/prohibiting setting member includes a main body for covering a portion of the cut-out portion. The writing permitting/prohibiting setting member slides along the cut-out portion so as to set data write to the semiconductor memory to be permitted or prohibited. By this, the above-described objective is achieved.

The writing permitting/prohibiting setting member may further include an engaging piece, and a guide engaged with the engaging piece for slidably holding the writing permitting/prohibiting setting member may be formed on each of both sides of the cut-out portion.

The engaging pieces may be elastic so as to be deformed by a contact with the memory card main body when the writing permitting/prohibiting setting member is attached to the memory card main body.

The memory card main body may have a surface, the writing permitting/prohibiting setting member may have a surface; and the engaging piece may be engaged with the guide so that the surface of the writing permitting/prohibiting setting member does not project from the surface of the memory card main body.

The surface of the memory card main body may include a first surface and a second surface, the guide may have a first guide corresponding to the first surface and a second guide corresponding to the second surface, the engaging piece may include a first engaging piece engageable with the first guide and a second engaging piece engageable with the second guide, and the writing permitting/prohibiting setting member may have a substantially U-shaped cross-section so that the first and second engaging pieces are respectively engageable with the first and second guides and therefore the writing permitting/prohibiting setting member holds the memory card main body.

The cut-out portion and the first and second guides may be integrally formed during a molding process for sealing the semiconductor memory.

A first guide taper portion and a second guide taper portion respectively for guiding the first and second engaging pieces to the first and second guides when the writing permitting/prohibiting setting member may be attached to the memory card main body are formed respectively on both sides of the cut-out portion.

A recessed portion capable of absorbing a thickness of the engaging piece may be formed on each of both sides of the cut-out portion, the guide may be formed in the recessed portion, and the engaging piece may have a projection engageable with the guide.

The memory card main body may have a surface, the writing permitting/prohibiting setting member may have a surface, and the engaging piece may be engaged with the recessed portion so that the surface of the writing permitting/prohibiting setting member does not project from the surface of the memory card main body.

The surface of the memory card main body may include a first surface and a second surface, the guide may have a first guide corresponding to the first surface and a second guide corresponding to the second surface, the projection may include a first projection engageable with the first guide and a second projection engageable with the second guide, and the writing permitting/prohibiting setting member may have a substantially U-shaped cross-section so that the first and second projections are respectively engageable with the first and second guides and therefore the writing permitting/prohibiting setting member holds the memory card main body.

The cut-out portion and the first and second guides may be integrally formed during a molding process for sealing the semiconductor memory.

A first guide taper portion and a second guide taper portion respectively for guiding the first and second projections to the first and second guides when the writing permitting/prohibiting setting member may be attached to the memory card main body are formed respectively on both sides of the cut-out portion.

BRIEF DESCRIPTION OF THE DRAWINGS

FIG. 5 is a view illustrating a setting operation of the memory card shown in FIG. 1.

FIG. 6 is a view illustrating setting detection of the memory card shown in FIG. 1.

BEST MODE FOR CARRYING OUT THE INVENTION

EXAMPLE 1

A first example according to the present invention will be described with reference to FIGS. 1 through 6.

Figure 1:
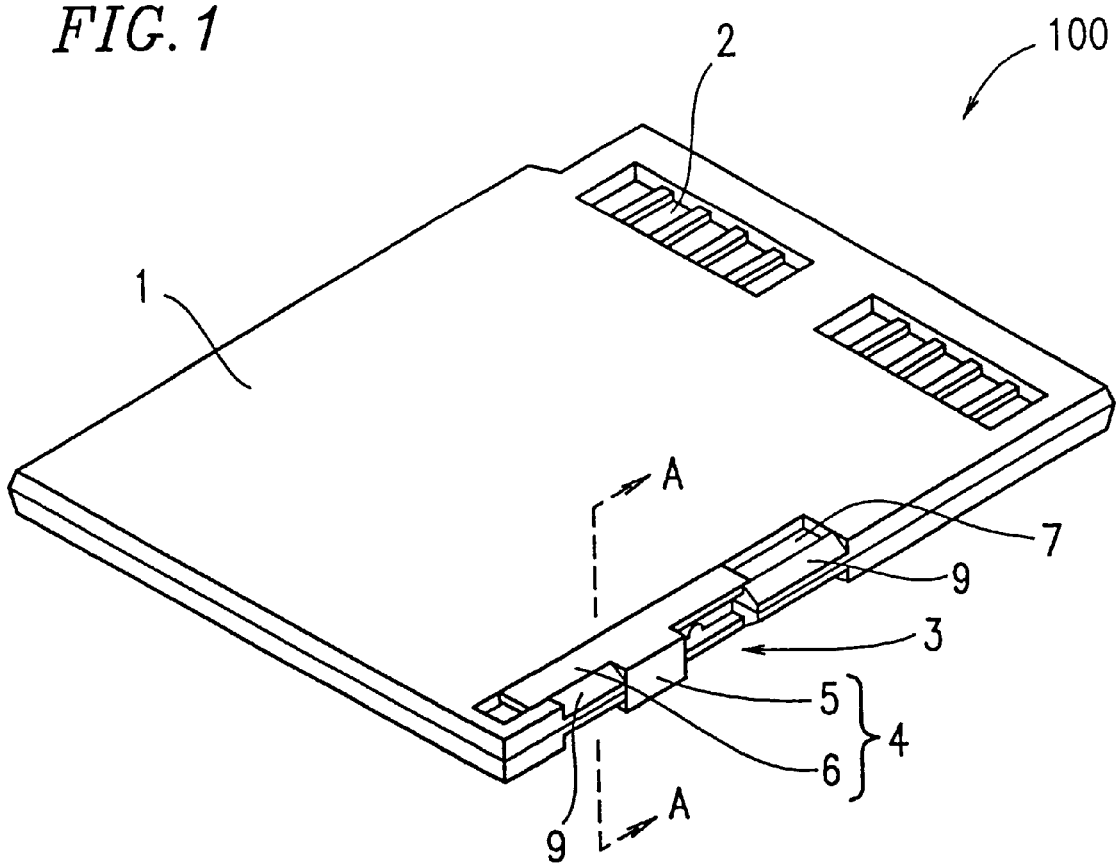
FIG. 1 is an isometric view of a memory card in a first example according to the present invention in an assembled state.
Figure 2:
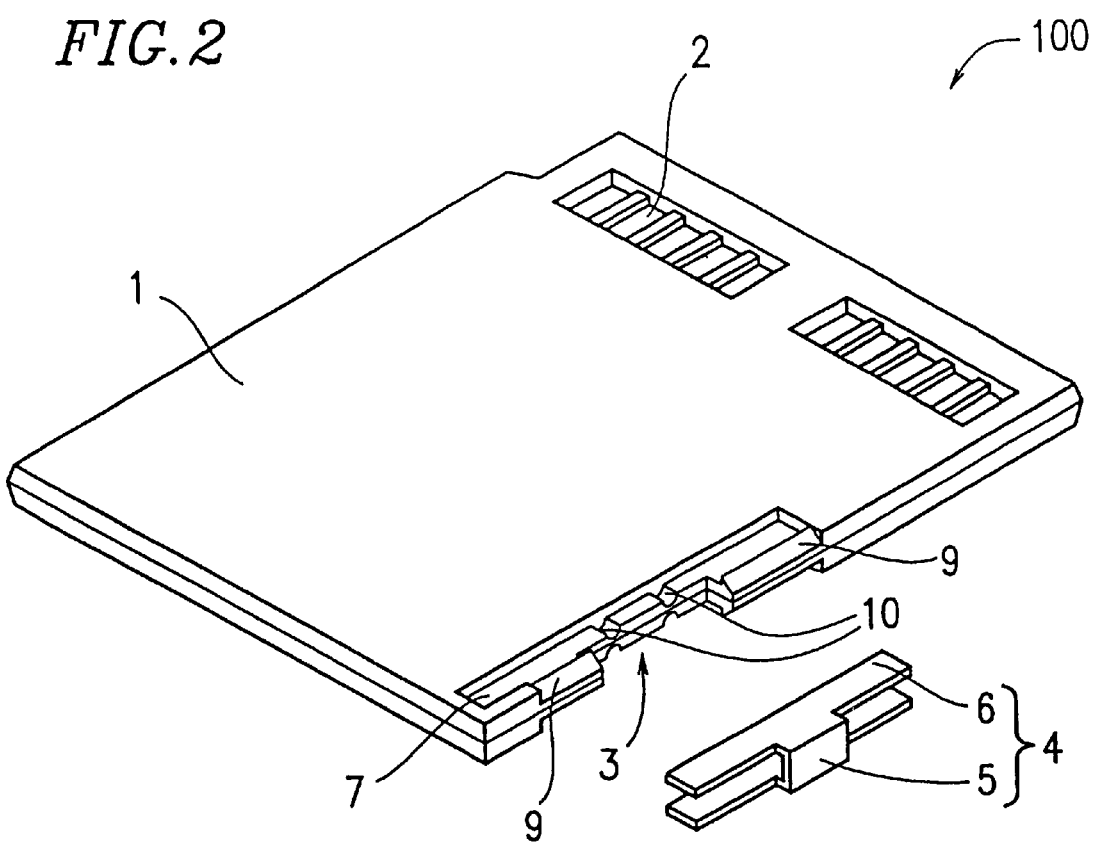
FIG. 2 is an exploded isometric view of the memory card shown in FIG. 1.
Figure 3:
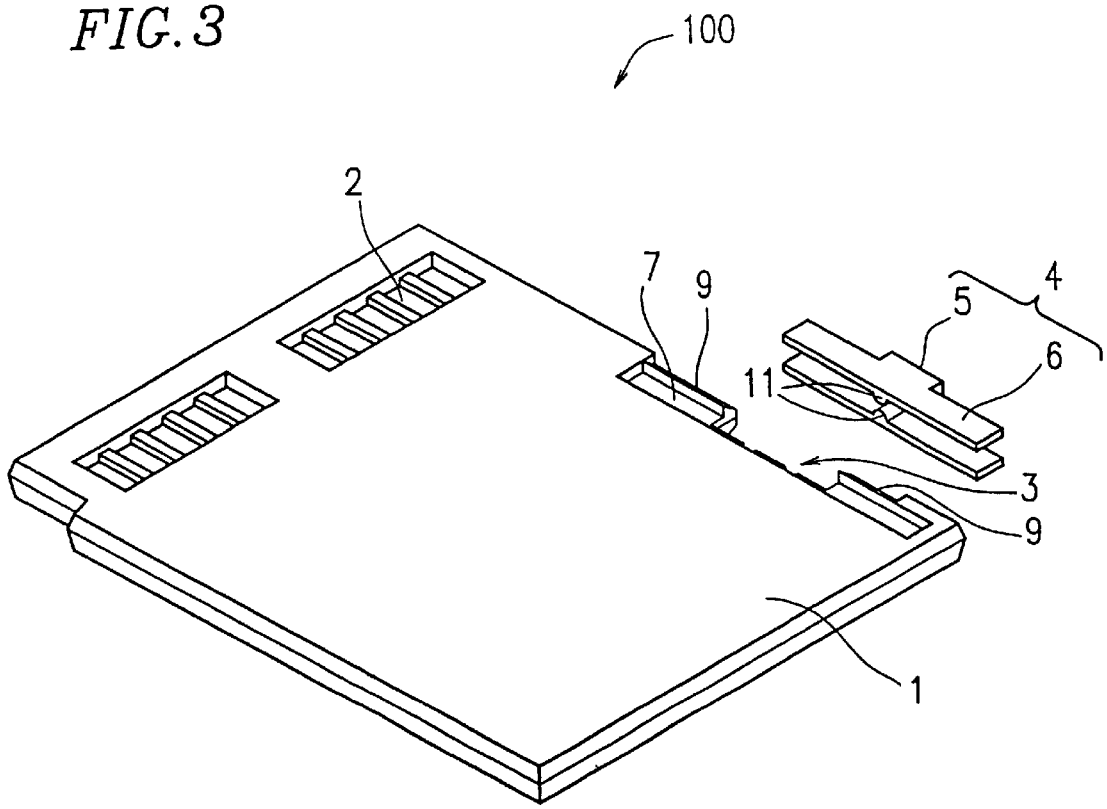
FIG. 3 is an exploded isometric view of the memory card shown in FIG. 1.
Figure 4:
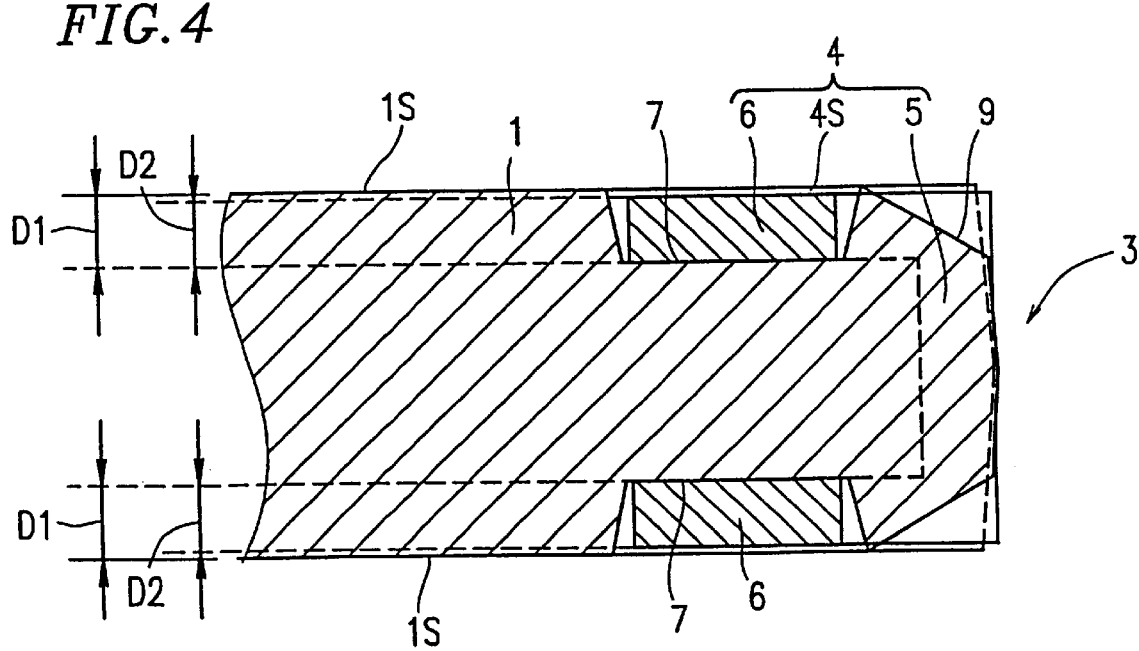
FIG. 4 is a cross-sectional view taken along the A—A line of the memory card shown in FIG. 1.

FIG. 1 is an isometric view of a memory card 100 in the first example according to the present invention in an assembled state. FIGS. 2 and 3 are exploded isometric views of the memory card 100 shown in FIG. 1. FIG. 4 is a cross-sectional view taken along the A—A line of the memory card 100 shown in FIG. 1. FIG. 5 is a view illustrating a setting operation of the memory card 100 shown in FIG. 1. FIG. 6 is a view illustrating setting detection of the memory card 100 shown in FIG. 1.

In FIGS. 1 through 4, reference numeral 1 represents a memory card main body. The memory card main body 1 integrally has a terminal 2 for electric connection with an apparatus, and has a rewritable semiconductor memory (not shown) therein. The apparatus (not shown) electrically connected with the semiconductor memory through the terminal 2 reads and rewrites data stored in the semiconductor memory. For rewriting, writing permitting/prohibiting setting means described below is provided in order to prevent the stored data from being inadvertently erased or rewritten.

Reference numeral 3 represents a cut-out portion formed on a side surface of the memory card main body 1. The cut-out portion 3 provides a planar shape of the memory card main body 1 with a quadrangular recess. A writing permitting/prohibiting setting member 4 is slidably engaged with the cut-out portion 3. The writing permitting/prohibiting setting member 4 includes a main body 5 for covering a portion of the cut-out portion 3 and engaging pieces 6. Each engaging piece 6 is engaged with a guide groove 7 formed in the vicinity of the cut-out portion 3 of the memory card main body 1 and is slidably held. The engaging pieces 6 can be elastic so as to be deformed by a contact with the memory card main body 1 when the writing permitting/prohibiting setting member 4 is attached to the memory card main body 1.

As shown in FIG. 4, the guide grooves 7 are formed in the vicinity of the cut-out portion 3 of the memory card main body 1. Each guide groove 7 is lower than a surface 1S of the memory card main body 1 and is formed on each of a top surface and a bottom surface of the memory card main body 1 symmetrically. The writing permitting/prohibiting setting member 4 is formed to have a substantially U-shaped cross-section so as to be held by the guide grooves 7 on the top and bottom surfaces. The engaging pieces 6 provided on the top and bottom surfaces so as to face each other are slidably engaged with the guide grooves 7, respectively. In the state where the engaging pieces 6 are engaged with the guide grooves 7, a step D1 between the surface is is the memory card main body 1 and each guide groove 7 absorbs a thickness D2 of the respective engaging piece 6 of the writing permitting/prohibiting setting member 4 (the thickness D2 is the step between a surface 4S of the writing permitting/prohibiting setting member 4 and the guide groove 7). Thus, each engaging piece 6 does not project from the respective surface 1S of the memory card main body 1.

Guide taper portions 9 are formed at an end surface of the memory card main body 1 corresponding to the guide grooves 7. The guide taper portions 9 each have an end surface which is thinner than the thickness of the memory card main body 1 and become thicker toward the respective guide grooves 7. The guide taper portions 9 are formed on the top and bottom sides of the end surface of the memory card main body 1 in a range corresponding to the total width of the engaging pieces 6. Thus, the guide taper portions 9 act as a guide for guiding the engaging pieces 6 toward the guide grooves 7 when the engaging writing permitting/prohibiting setting member 4 is to be engaged with the guide grooves 7.

With reference to FIG. 2, reference numeral 10 represents stoppers. Two stoppers 10 are formed on each of the top and bottom faces in the guide grooves 7. A rib 11 (FIG. 3) formed on an inner surface of each of the top and bottom engaging pieces 6 so as to project inward the engaging pieces 6 are stopped by the respective stoppers 10. The rib 11 is stopped by either one of the two stoppers 10, and thus the writing permitting/prohibiting setting member 4 can select the position at which the cut-out portion 3 is covered.

Among these elements, the cut-out portion 3 integrally formed in the memory card main body 1, the top and bottom guide grooves 7, the guide taper portions 9, and the stoppers 10 are integrally formed during a molding process for sealing the semiconductor memory.

An operation of the memory card having the above-described structure will be described.

With reference to FIGS. 2 and 3, in order to engage the writing permitting/prohibiting setting member 4 with the memory card main body 1, the writing permitting/prohibiting setting member 4 is caused to touch the memory card main body 1 so that the engaging members 6 hold the guide taper portions 9. The writing permitting/prohibiting setting member 4 is pushed into the memory card main body 1, thereby expanding the engaging pieces 6 with the guide taper portions 9 being used as a guide and thus guiding the engaging pieces 6 to the guide grooves 7. As shown in FIG. 1, the engaging pieces 6 fit in the guide grooves 7, and the writing permitting/prohibiting setting member 4 is slidably engaged with the memory card main body 1.

As shown in FIGS. 5(a) and 5(b), a main body 5 of the writing permitting/prohibiting setting member 4 engaged with the memory card main body 1 covers a portion of the cut-out portion 3. As shown in FIGS. 5(a) and 5(b), the portion of the cut-out portion 3 which is covered is about half on the left or the right. In FIG. 5(a), the left portion is covered. The covered portion is substantially integral with the exterior of the memory card main body 1. The substantially half portion on the right which is not covered provides the planar shape of the memory card main body 1 with a quadrangular recess. By sliding the writing permitting/prohibiting setting member 4 to the right, the right portion is covered as shown in FIG. 5(b). By selecting the position of the cut-out portion 3 to be covered by sliding the writing permitting/prohibiting setting member 4 in this manner, it is set whether data write on the memory card 100 is permitted or prohibited.

Whether the data write is permitted or prohibited is set by holding the main body 5 with fingers and sliding the writing permitting/prohibiting setting member 4 to the right or to the left. At this point, the writing permitting/prohibiting setting member 4 can be slid with an appropriate clicking feel due to engagement or disengagement of the rib 11 and the stopper 10, and can also be prevented from inadvertently sliding. The quadrangular recess of the cut-out portion 3 which is not covered with the writing permitting/prohibiting setting member 4 also has a function of an indicator, and thus it can be clearly visualized whether the data write is set to be permitted or prohibited. Here, the writing permitting/prohibiting setting member 4 includes the projecting rib 11, and the memory card main body 1 includes the recess-type stoppers 10. The shape of each element is not limited to this as long as the elements are structured to be freely engageable and disengageable.

Next, a method for allowing the apparatus, to which the memory card is inserted and connected, to detect whether the data write to the memory card is set to be permitted or prohibited will be described with reference to FIGS. 6(a) and 6(b).

In FIG. 6(a), reference numeral 13 represents an apparatus to which the memory card is inserted and connected, and reference numeral 14 represents a detection switch provided on the apparatus 13. The detection switch 14 includes a detection section 15 and a contact 16. Like in FIG. 5(a), the writing permitting/prohibiting setting member 4 covers a left portion of the cut-out portion 3. It is assumed that in the state where the writing permitting/prohibiting setting member 4 is positioned at the left, the data write is set to be permitted. In this state, the writing permitting/prohibiting setting member 4 covers the left portion of the cut-out portion 3. Accordingly, the detection section 15 of the detection switch 14 is raised, thereby closing the contact 16. By detecting the closed state of the contact 16, the apparatus 13 can recognize that data write on the memory card 1 is permitted. The detection by the switch 14 can be performed also in the case where the position of the writing permitting/prohibiting setting member 4 is opposite.

In the state where the writing permitting/prohibiting setting member 4 is positioned at the right as shown in FIG. 6(b), the data write is set to be prohibited. In this state, since the left portion of the cut-out portion 3 is not covered with the writing permitting/prohibiting setting member 4, the detection section 15 of the detection switch 14 is not raised and thus the contact 16 is opened. By detecting the opened state of the contact 16, the apparatus 13 can recognize that data write on the memory card main body 1 is prohibited.

EXAMPLE 2

A second example according to the present invention will be described with reference to FIGS. 7 and 8.

Figure 7:
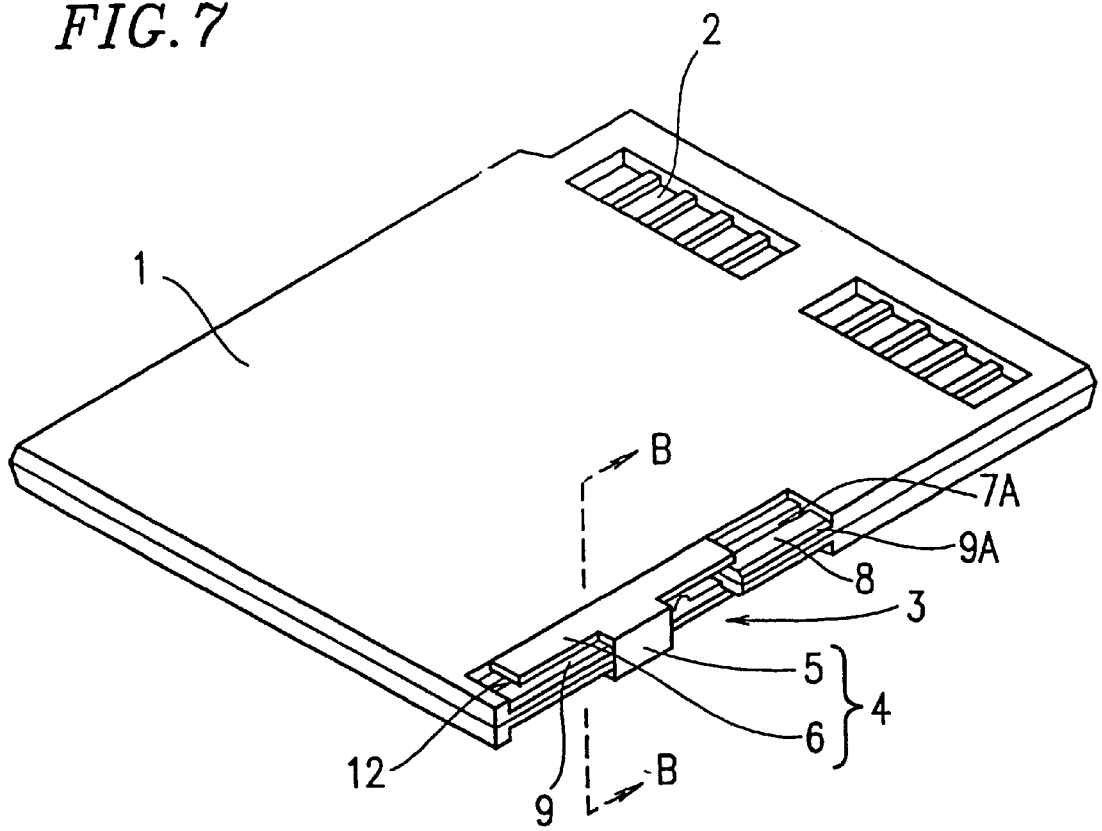
FIG. 7 is an isometric view of a memory card in a second example according to the present invention in an assembled state.
Figure 8:
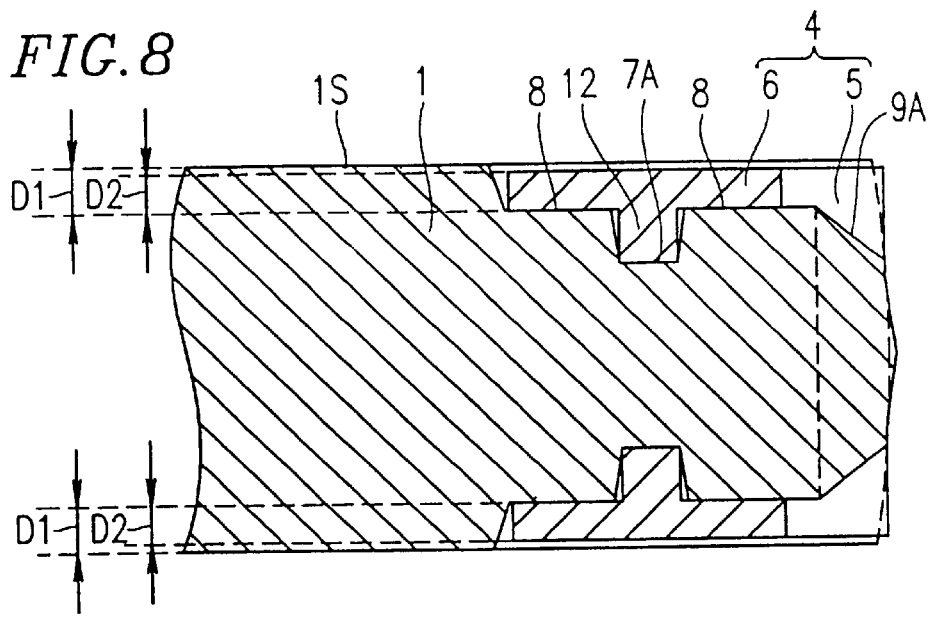
FIG. 8 is a cross-sectional view taken along the B—B line of the memory card shown in FIG. 7.
Figure 9:
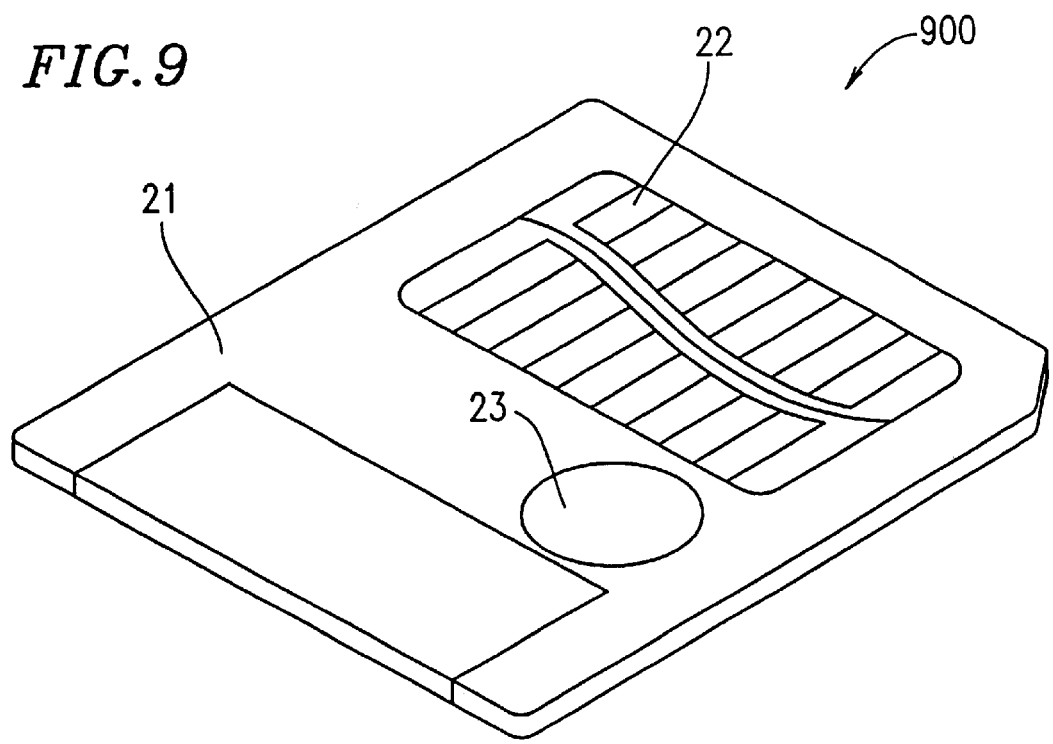
FIG. 9 is an isometric view of a conventional memory card having writing permitting/prohibiting setting means in the form of a reflective sheet.
Figure 10:
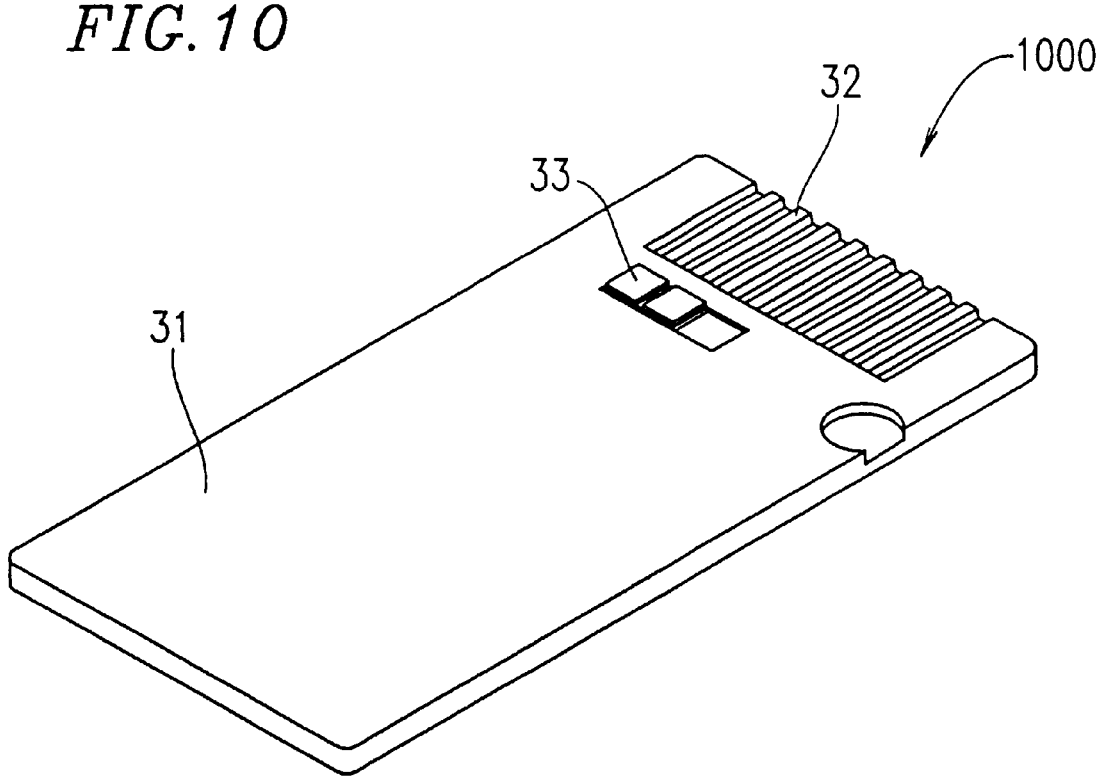
FIG. 10 is an isometric view of a conventional memory card having writing permitting/prohibiting setting means in the form of a switch.

FIG. 7 is an isometric view of a memory card in a second example according to the present invention in an assembled state, and FIG. 8 is a cross-sectional view taken along the B—B line of the memory card shown in FIG. 7.

As shown in FIGS. 7 and 8, recessed [portioned] portions 8 are formed in the vicinity of the cut-out portion 3 of the memory card main body 1, in a range in which the writing permitting/prohibiting setting member 4 is slidable. In each recessed portion 8, a guide groove 7 is formed. Each recessed portion 8 is lower than a surface 1S of the memory card main body 1. At a substantial center of each recessed portion 8, the guide groove 7A which is lower than the recessed portion 8 is formed. Each recessed portion 8 and each guide groove 7A are formed on each of top and bottom surfaces of the memory card main body 1 symmetrically. The writing permitting/prohibiting setting member 4 is formed to have a substantially U-shaped cross-section so as to be held by the recessed portion 8 on the top and bottom surfaces. The engaging pieces 6 are the top surface and the bottom-surface of the writing permitting/prohibiting setting member 4. A projection 12 is on an inner surface of each of the top and bottom engaging pieces 6 and is slidably engaged with the respective guide groove 7A. When the projections 12 are engaged with the guide grooves 7A, a step between the surface of the memory card main body 1 and each recessed portion 8 absorbs the thickness of the respective engaging piece 6 of the writing permitting/prohibiting setting member 4. Thus, each engaging piece 6 does not project from the respective surface 1S of the memory card main body 1.

The projection can be lengthy and formed along a longitudinal direction of each engaging piece 6 or can be short and formed in the vicinity of the tip thereof.

A guide taper portion 9A is formed at an end surface of each of the recessed portions 8 formed in the memory card main body 1. The guide taper portions 9A each have an end surface which is thinner than the thickness of the memory card main body 1 and become thicker from the end surface toward the recessed portion 8. The guide taper portions 9 are formed on the top and bottom surfaces of the memory card main body 1 in a range corresponding to the total width of the engaging pieces 6. Thus, the guide taper portions 9 act as a guide for guiding the engaging pieces 6 toward the guide grooves 7 when the engaging writing permitting/prohibiting setting member 4 is engaged.

The other elements are the same as those in the first example. Identical elements bear identical reference numerals and description thereof will be omitted.

In order to engage the writing permitting/prohibiting setting member 4 with the memory card main body 1, the writing permitting/prohibiting setting member 4 is caused to touch the memory card main body 1 so that the projections 12 inside the engaging pieces 6 hold the guide taper portions 9. The writing permitting/prohibiting setting member 4 is pushed into the memory card main body 1, thereby expanding the engaging pieces 6 each having the projection 12, with the guide taper portions 9 being used as a guide and thus guiding the projections 12 to the guide grooves 7. Thus, the projections 12 fit in the guide grooves 7, and the writing permitting/prohibiting setting member 4 is slidably engaged with the memory card main body 1.

In this example, as shown in FIG. 8, the projection 12 is provided in each engaging piece 6 and has a T-shaped cross-section. In the case where the projection 12 is lengthy, a thickness D3 of the projection 12 can be sufficiently large to be rigid in the sliding direction of the writing permitting/prohibiting setting member 4 so as to avoid warping. Therefore, the thickness of the engaging piece 6 can be thinner.

INDUSTRIAL APPLICABILITY

As described above, according to the present invention, a writing permitting/prohibiting setting member is slidably engaged with a cut-out portion formed on a side surface of a memory card main body, and data write is set to be permitted or prohibited by selecting a position of the cut-out portion to be covered by a sliding operation of the writing permitting/prohibiting setting member. Thus, data write can be set to be permitted or prohibited by changing the cut-out portion by a simple operation of sliding the writing permitting/prohibiting setting member while the thin shape of the card is maintained without any projection being provided on a side surface of the memory card main body. Since a movable component such as a switch is not incorporated in the memory card main body for setting data write to be permitted or prohibited, the entire memory card can be thinner. By providing the cut-out portion and the writing permitting/prohibiting setting member on a side surface of the memory card main body, the ratio of an effective area in which a semiconductor memory or the like can be built in can be increased, thus reducing the size of the entire memory card.

What is claimed is:

1. A memory card, comprising:
   a memory card main body having a cut-out portion with a quadrangular recess on a side surface of a planar shape;
   a semiconductor memory in which data is at least writable; and
   a write permitting/prohibiting setting member slidably engaged with the cut-out portion for setting data write to the semiconductor memory to be permitted or prohibited,
   wherein:
   the write permitting/prohibiting setting member includes a main body for selecting between a first position for covering a first portion of the cut-out portion and a second position for covering a second portion of the cut-out portion, so that the cut-out portion has an uncovered portion in each of the first and second positions, and
   the write permitting/prohibiting setting member slides between the first position for the first portion of the cut-out portion and the second position for covering the second portion of the cut-out portion so as to set data write to the semiconductor memory to be permitted or prohibited.

2. A memory card according to claim 1, wherein the writing permitting/prohibiting setting member further includes an engaging piece, and a guide engaged with the engaging piece for slidably holding the writing permitting/prohibiting setting member is formed on each of both sides of the cut-out portion.

3. A memory card according to claim 2, wherein the engaging pieces are elastic so as to be deformed by a contact with the memory card main body when the writing permitting/prohibiting setting member is attached to the memory card main body.

4. A memory card according to claim 2, wherein:
   the memory card main body has a surface,
   the writing permitting/prohibiting setting member has a surface; and
   the engaging piece is engaged with the guide so that the surface of the writing permitting/prohibiting setting member does not project from the surface of the memory card main body.

5. A memory card according to claim 4, wherein:
   the surface of the memory card main body includes a first surface and a second surface,
   the guide has a first guide corresponding to the first surface and a second guide corresponding to the second surface,
   the engaging piece includes a first engaging piece engageable with the first guide and a second engaging piece engageable with the second guide, and
   the writing permitting/prohibiting setting member has a substantially U-shaped cross-section so that the first and second engaging pieces are respectively engageable with the first and second guides and therefore the writing permitting/prohibiting setting member holds the memory card main body.

6. A memory card according to claim 5, wherein the cut-out portion and the first and second guides are integrally formed during a molding process for sealing the semiconductor memory.

7. A memory card according to claim 6, wherein a first guide taper portion and a second guide taper portion respectively for guiding the first and second engaging pieces to the first and second guides when the writing permitting/prohibiting setting member is attached to the memory card main body are formed respectively on both sides of the cut-out portion.

8. A memory card according to claim 2, wherein:
   a recessed portion capable of absorbing a thickness of the engaging piece is formed on each of both sides of the cut-out portion,
   the guide is formed in the recessed portion, and
   the engaging piece has a projection engageable with the guide.

9. A memory card according to claim 8, wherein:

the memory card main body has a surface, the writing permitting/prohibiting setting member has a surface, and the engaging piece is engaged with the guide so that the surface of the writing permitting/prohibiting setting member does not project from the surface of the memory card main body.

10. A memory card according to claim 9, wherein:

the surface of the memory card main body includes a first surface and a second surface, the guide has a first guide corresponding to the first surface and a second guide corresponding to the second surface, the projection includes a first projection engageable with the first guide and a second projection engageable with the second guide, and the writing permitting/prohibiting setting member has a substantially U-shaped cross-section so that the first and second projections are respectively engageable with the first and second guides and therefore the writing permitting/prohibiting setting member holds the memory card main body.

11. A memory card according to claim 10, wherein the cut-out portion and the first and second guides are integrally formed during a molding process for sealing the semiconductor memory.

12. A memory card according to claim 11, wherein a first guide taper portion and a second guide taper portion respectively for guiding the first and second projections to the first and second guides when the writing permitting/prohibiting setting member is attached to the memory card main body are formed respectively on both sides of the cut-out portion.

13. A memory card according to claim 1, further comprising a terminal on the memory card main body for electrically connecting the semiconductor memory and an external apparatus.

14. A memory card according to claim 1, wherein said writing permitting/prohibiting setting member does not extend beyond said side surface of said main body.

15. A memory card, comprising:

a planar body having a cut-out portion in a side edge of said planar body extending parallel to said side edge and a semiconductor memory within said planar body in which data is at least writable; and a writing permitting/prohibiting setting member having a length less than the length of said cut-out portion and slidably engaged with said planar body for movement parallel to said side edge of said planar body and along said cut-out portion between:

(a) a first position covering a first portion of said cut-out portion and not covering a second portion of said cut-out portion to set data write to the semiconductor memory to be permitted, and (b) a second position covering the second portion of said cut-out portion and not covering the first portion of said cut-out portion to set data write to the semiconductor memory to be prohibited.

16. A memory card according to claim 15, further comprising a terminal on said planar body for electrically connecting said semiconductor memory and an external apparatus.

17. A memory card according to claim 15, wherein said writing permitting/prohibiting setting member does not extend beyond said side edge of said planar body.

\* \* \* \* \*